(12) United States Patent  
Gavrilov et al.

(10) Patent No.: US 7,909,388 B2
(45) Date of Patent: Mar. 22, 2011

(54) DEVICE FOR PROTECTION AGAINST IMPACT, MOTOR VEHICLE PILLAR, AND MOTOR VEHICLE DOOR

(75) Inventors: Christo Gavrilov, Karlsruhe (DE); Marco Braun, Lug (DE); Steve Kober, Treuen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 364 days.

(21) Appl. No.: 12/093,735

(22) PCT Filed: Oct. 19, 2006

(86) PCT No.: PCT/EP2006/067579
§ 371 (c)(1), (2), (4) Date: Jul. 16, 2008

(87) PCT Pub. No.: WO2007/057275
PCT Pub. Date: May 24, 2007

(65) Prior Publication Data
US 2008/0277967 A1    Nov. 13, 2008

(30) Foreign Application Priority Data

Nov. 16, 2005  (DE) .................. 10 2005 055 082

(51) Int. Cl.
*B62D 21/15* (2006.01)
(52) U.S. Cl. ............... 296/187.12; 296/193.02; 296/70
(58) Field of Classification Search ............ 296/187.05, 296/187.12, 193.02, 193.06, 203.03, 70
See application file for complete search history.

(56) References Cited

U.S. PATENT DOCUMENTS

| | | | |
|---|---|---|---|
| 3,931,988 A | 1/1976 | Oehm | |
| 3,947,056 A | 3/1976 | Schwanz | |
| 4,231,607 A | 11/1980 | Bohlin | |
| 4,723,792 A * | 2/1988 | Sakamoto et al. | 280/751 |
| 4,934,736 A | 6/1990 | Huisman | |
| 4,978,136 A | 12/1990 | Tomita et al. | |
| 5,037,130 A | 8/1991 | Okuyama | |
| 5,156,416 A | 10/1992 | Frank | |
| 5,273,314 A | 12/1993 | Sakakibara | |
| 5,328,234 A | 7/1994 | Daniel et al. | |
| 5,482,319 A | 1/1996 | Yoshimura et al. | |
| 5,564,769 A | 10/1996 | Deneau et al. | |
| 5,632,507 A | 5/1997 | Sinner | |
| 5,749,600 A * | 5/1998 | Yamada et al. | 280/751 |

(Continued)

FOREIGN PATENT DOCUMENTS

DE  1239583  4/1967

(Continued)

OTHER PUBLICATIONS

International Preliminary Report on Patentability and Written Opinion for PCT/EP2006/067579.

(Continued)

*Primary Examiner* — Jason S Morrow
(74) *Attorney, Agent, or Firm* — Matthew B. Dernier, Esq.; Gibson & Dernier LLP (57) ABSTRACT

A device for protection against an impact includes at least one energy absorption body, which is arranged behind an interior car body component, so that a force (F) in effect during an impact is transferred from an exterior car body component through an opening of the interior car body component to the energy absorption body.

25 Claims, 7 Drawing Sheets

U.S. PATENT DOCUMENTS

| | | | |
|---|---|---|---|
| 5,997,077 A | 12/1999 | Siebels et al. | |
| 6,237,991 B1 | 5/2001 | Weber | |
| 6,250,711 B1 | 6/2001 | Takahara | |
| 6,279,973 B1 | 8/2001 | Albertini | |
| 6,730,386 B1 | 5/2004 | Stahlke et al. | |
| 7,014,249 B2 * | 3/2006 | Karuppaswamy et al. | 296/146.6 |
| 7,104,592 B2 * | 9/2006 | Song | 296/187.12 |
| 2004/0126532 A1 * | 7/2004 | Gardner, Jr. | 428/43 |
| 2007/0256877 A1 | 11/2007 | Melz et al. | |
| 2009/0026799 A1 * | 1/2009 | Gavrilov | 296/187.05 |

FOREIGN PATENT DOCUMENTS

| | | |
|---|---|---|
| DE | 2061595 | 7/1972 |
| DE | 2248003 | 5/1974 |
| DE | 2312202 | 9/1974 |
| DE | 2335958 | 1/1975 |
| DE | 2816318 A1 | 10/1978 |
| DE | 2856437 A1 | 7/1980 |
| DE | 3038252 | 6/1982 |
| DE | 3905950 A1 | 9/1989 |
| DE | 4016670 | 12/1990 |
| DE | 19502226 | 5/1996 |
| DE | 19531986 A1 | 5/1996 |
| DE | 19615875 | 10/1997 |
| DE | 19625457 | 1/1998 |
| DE | 19712902 | 3/1998 |
| DE | 19736839 | 2/1999 |
| DE | 19924641 A1 | 2/2000 |
| DE | 19945590 A1 | 3/2001 |
| DE | 19952570 | 5/2001 |
| DE | 69627524 T2 | 11/2003 |
| DE | 10358023 A1 | 7/2005 |
| DE | 102004012500 A1 | 10/2005 |
| EP | 0983910 A | 3/2000 |
| GB | 2292913 | 3/1996 |

OTHER PUBLICATIONS

International Search Report and Written Opinion for PCT/EP2009/067579.

* cited by examiner

DEVICE FOR PROTECTION AGAINST IMPACT, MOTOR VEHICLE PILLAR, AND MOTOR VEHICLE DOOR

The invention concerns a device for protection against an impact as well as a motor vehicle pillar and a motor vehicle door.

Various energy absorbers for motor vehicles are already known from the state of the art, which are designed to absorb the impact energy of an impact by means of deformation [warpage]. For example, DE 20 61 595 shows an impact-absorbing front panel. DE 199 52 570 shows an energy absorber for absorbing impact energy. Additional deformation designs for energy absorption have become known from DE 197 36 839 and DE 30 38 252.

Also known from the state of the art is how to attach an impact protection element to the cross member of a motor vehicle, i.e. the so-called cockpit cross member, in particular from DE 23 12 202, DE 39 05 950 A1, DE 12 39 583, U.S. Pat. No. 5,273,314, U.S. Pat. No. 4,978,136, U.S. Pat. No. 5,037,130, U.S. Pat. No. 5,482,319, DE 195 02 226, DE 20 61 595, DE 22 48 003, DE 23 35 958, DE 40 16 670 and DE 197 12 902. Impact absorbers for cross member reinforcement have also become known from DE 196 25 457 and DE 196 15 875. A fastening design for foil energy absorbers is known from DE 199 24 641 A1. Two energy absorbers are coupled by a connecting element. The energy absorbers so connected to each other are fastened to a front pillar of a motor vehicle and the lateral roof rail. The disadvantage to this device is that fact that it is not suitable for protecting against a lateral impact.

An energy-absorbing arrangement is known from DE 696 27 524 T2. With this arrangement, the energy is absorbed by means of a cylinder that presses out the fluid which is found in a piston through an opening. This transforms the kinetic energy of a translatory motion of a body into kinetic energy of a fluid stream.

An impact-absorbing front panel for automobiles is known from DE 20 61 595, which features separate sections for protection of the head and torso on one hand and for the legs on the other hand.

The task which forms the basis of the invention is to create a better device for protection against an impact, as well as a better motor vehicle pillar and motor vehicle door.

The underlying tasks of the invention are each solved by the characteristics of the independent patent claims. Preferred embodiments of the invention are given in the dependent patent claims.

The invention creates a device for protection against an impact, which features at least one energy absorption body which is arranged behind an interior car body component. In the event of an impact, an impact force is transferred from an exterior car body component through an opening of the interior car body component to the minimum of one energy absorption body. On the basis of the transfer of the impact force directly from the exterior car body component through the opening of the interior car body component to the energy absorption body, the invention takes advantage of the deformation path of the exterior car body component in the direction of the interior car body component.

Even before the interior car body component is acted upon by the impact force, the impact force is transferred to the energy absorption body situated behind the interior car body component from the direction of the exterior car body component, so that the impact energy is reduced. In this way, even in the case of relatively large impact forces, a situation in which the passenger compartment is deformed or the car body components penetrate into the motor vehicle interior can be avoided.

This is particularly advantageous for lateral impact protection of a motor vehicle, since the rigidity of the passenger compartment can be increased by transferring the impact force to the energy absorption body.

In one embodiment of the invention, the means for transferring the impact force have an area that protrudes in the direction of the opening of the interior car body component, thereby forming a force transfer element. For example, it pertains to an element attached to an inside of the exterior car body component, such as a panel. For example the panel may feature a U-shaped profile section, which forms the area protruding to the opening of the interior car body component.

In one embodiment of the invention, the area is already mechanically connected to the energy absorption body before an impact. To this end, the area can project through the opening in the interior car body component or at least project into this opening.

In another embodiment of the invention the force transfer element and the energy absorption body are not directly connected to one another mechanically before an impact. For example, the force transfer element is shorter than the distance between the interior and exterior car body components.

Only when deformation of the exterior car body component occurs due to an impact does the area of the force transfer element protruding in the direction of the opening of the interior car body component pass through the opening of the interior car body component, in order to act upon the energy absorption body.

The opening of the interior car body component can be closed by means of a cover, such as a protective cap or other decorative element. In the event of an impact, the cover is removed or pierced by the force transfer element.

In one embodiment of the invention, the exterior car body component is a lateral exterior panel and the interior car body component is a lateral interior panel of the motor vehicle. For example, the exterior car body component is an exterior limit [boundary] of a pillar of the motor vehicle and the interior car body component is an interior limit of the pillar. The pillar can also be a so-called A-, B-, C- or D-pillar of a motor vehicle.

In one embodiment of the invention, the exterior car body component is an exterior door panel and the interior car body component is an interior door panel.

In one embodiment of the invention the opening in the interior door panel is attached in the vicinity of a pivot axis of the door, so that the opening is not visible from the vehicle interior [passenger compartment] when the door is closed. For example, the opening is arranged so that it is located opposite a lateral panel of the instrument panel when the door is closed.

In one embodiment of the invention two or more of the energy absorption bodies are arranged in parallel, wherein the means for transferring the impact force is designed in such a way that both energy absorption bodies are acted upon in the event of an impact.

In one embodiment of the invention two or more of the energy absorption bodies are arranged in series.

In one embodiment of the invention, one or more of the energy absorption bodies are integrated into a cross member of the motor vehicle. Alternatively or in addition, one or more of the energy absorption bodies can be integrated into an instrument panel. Preferably, it is a self-supporting instrument panel, which means the cross member can be eliminated. The self-supporting instrument panel can include a support layer made up of a blend of SMA and ABS.

In one embodiment of the invention, the energy absorption body features orthotropic elasticity. For example, the energy absorption body is very stiff in the axial direction and not very stiff at all in a radial direction. If the energy absorption body is acted upon in the axial direction with a lateral impact force during a lateral impact, a deformation of the passenger compartment and/or penetration of car body components into the motor vehicle interior is prevented due to the rigidity of the energy absorption body in this direction. If the energy absorption body is acted upon in a radial direction during a frontal impact, on the other hand, the result is a deformation of the energy absorber so that it can, for example, work as a so-called knee-impact pad.

In one embodiment of the invention, the energy absorption body has a hollow piece extending basically in an axial direction. The hollow piece is filled at least partially with a filling. Pressure can be exerted on the filling by means of a piston, so that an impact force acting on the piston in an axial direction can be absorbed.

Due to the pressure that is produced by the force exerted on the piston, the partition [wall; side] of the hollow piece is under tension [stress], whereby the rigidity of the hollow piece can be increased. Preferably, the partition of the hollow piece and the filling in the hollow piece are designed in such a way that the hollow piece is deformed when a force is exerted on the energy absorption body in radial direction.

This therefore creates an energy absorption body that exhibits different mechanical properties depending on the load situation. If the stress [force] is in axial direction, the rigidity of the energy absorption body increases, in order to increase the rigidity of a passenger compartment of a motor vehicle, for example, and prevent car body components from penetrating into the vehicle interior during a lateral impact. If the hollow piece is stressed in radial direction instead of in axial direction, however, the hollow piece is deformed along with the filling located within, since in this case the pressure does not affect the filling. The deformation of the hollow piece and the filling found within it results in the absorption of impact energy, such as occurs in a frontal impact.

In one embodiment of the invention, the hollow piece has a wall thickness of between 1 and 5 mm.

In one embodiment of the invention, the filling of the hollow piece features a fluid such as water or oil.

In one embodiment of the invention, the filling features foam, such as a plastic foam and/or a metal foam. The foam is preferably filled with a filler material.

In one embodiment of the invention, the filling features foam composite.

In one embodiment of the invention, the filling contains several solids [bodies], which may be ball-shaped. The balls may have a diameter between 0.5 cm and 5 cm, preferably between 1 cm and 3 cm. The solids may consist of an essentially incompressible material, such as glass powder, so that the solids cannot change their shape or almost cannot change their shape as a result of the pressure. The solids may also consist of a material with a relatively large transversal contraction coefficient, known as the Poisson coefficient, such as plastic.

In one embodiment of the invention the solids of the hollow piece filling are hollow and/or porous.

In one embodiment of the invention, the filling contains a substance made from a material with a transversal contraction coefficient of at least 0.25, preferably at least 0.3.

Such a material is characterized by the fact that the thickness of a solid consisting of the material increases during a stress in axial direction so that the force acting in axial direction is transferred to the partition of the hollow piece and can be absorbed there as tensile force. Thus the filling can consist of a uniform block of such a substance or of a number of solids containing the substance.

In one embodiment of the invention, the filling contains a fluid, such as oil or water, rubbery or highly-elastic plastics, as well as polyurethane and/or particle foams.

In one embodiment of the invention, the hollow piece filling has a matrix for assimilating [absorbing] a number of solids. For example, it might consist of a foam matrix in which the balls or similar elements are embedded. In undisturbed [unstressed] state, the solids can be distanced from one another by the matrix. If, for example, a force acts on the piston in axial direction during a lateral impact, the matrix is compressed, such that the solids located in the matrix come into contact with one another. This leads to a situation where the force acting in axial direction is diverted via the solids to the partition of the hollow piece. The resulting tensile forces, which act on the partition of the hollow piece, are absorbed by the hollow piece and result in a stiffening of the hollow piece.

In one embodiment of the invention, the partition of the hollow piece consists at least partially of metal, preferably steel. Alternatively or additionally, the partition of the hollow piece can consist at least partially of reinforced plastic, in particular fiber optic-reinforced plastic and/or of plastic reinforced with and endless glass fiber.

According to one embodiment of the invention, the energy absorption body has at least two pistons arranged opposite one another, which can each act on the filling in axial direction.

According to one embodiment of the invention, the energy absorption body is arranged in a knee-impact area, a head-impact area and/or in the area of a glove compartment. There can also be several energy absorption bodies on hand for the various impact areas on the driver's side and/or the passenger's side.

In one embodiment of the invention, the energy absorption body is connected to a cross member, by means of a support for example.

Embodiments of the invention with reference to the drawings will be explained in more detail below. The following are shown:

FIG. 1 a cross section of an initial embodiment of a device according to the invention, FIG. 2 a view of FIG. 1 after a deformation of the exterior car body component due to an impact, FIG. 3 an embodiment of the device according to the invention with energy absorption bodies arranged in parallel, FIG. 4 the device of FIG. 3 after a deformation of the exterior car body component due to an impact, FIG. 5 an embodiment of a device according to the invention with energy absorption bodies arranged in series, FIG. 6 an embodiment of a device according to the invention with a single energy absorption body, which can be acted upon from both axial directions by a lateral impact force, FIG. 7 an embodiment of an energy absorption body represented in perspective, FIG. 8 a cross section of the energy absorption body of FIG. 7 during a stress [force] in axial direction, FIG. 9 a cross section of the energy absorption body of FIGS. 7 and 8 during a stress in radial direction, FIG. 10 a schematic longitudinal section of an embodiment of an energy absorption body, in which the filling features several solids, FIG. 11 a schematic view of one of the solids in unstressed state and during axial stress, FIG. 12 an embodiment of a device according to the invention with two energy absorption bodies arranged behind one another in the direction of travel, FIG. 13 a variation of the embodiment of FIG. 12 with an energy absorption body arranged laterally next to a motor vehicle door, FIG. 14 a perspective view of an instrument panel with several energy absorption bodies, FIG. 15 an embodiment of a device according to the invention with an energy absorption body supported on a cross member.

In the following description of figures, elements that correspond to one another are identified with corresponding reference marks.

Figure 1:
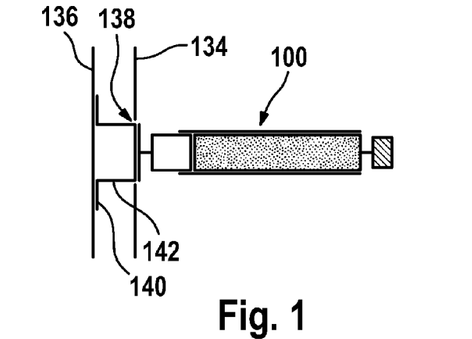

FIG. 1 shows an energy absorption body 100, which is arranged behind an interior car body component 134 as seen from the direction of an exterior car body component 136. Energy absorption body 100, for example, is connected directly or indirectly with another car body component, a cross member and/or a motor vehicle interior lining component, in particular an instrument panel.

Interior car body component 134 has an opening 138. Opening 138 can be closed or opened before an impact. For example, opening 138 can be defined by a predetermined breaking point, which is disconnected during an impact, so as to release opening 138. Opening 138 can also be covered with a cap or other decorative element, which in the event of an impact is detached from the opening or pierced by a force transfer element 140.

Force transfer element 140 is arranged on the inside of exterior car body component 136. Force transfer element 140 has an area 142, which protrudes in the direction of opening 138. In the embodiment under review here, area 142 has a U-shaped profile.

Figure 2:
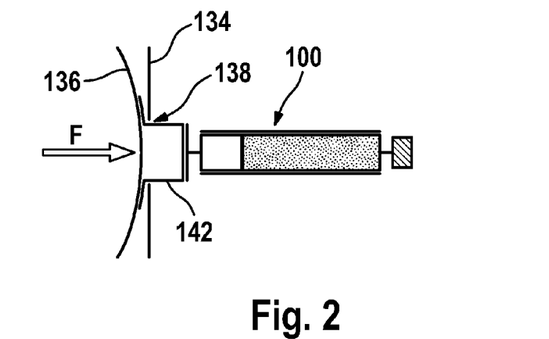

In the event of an impact, exterior car body component 136 is deformed, as shown in FIG. 2. Impact force F thus acts in axial direction. Area 142 is thereby pressed through in interior car body component 134 through opening 138, so that impact force F acts on energy absorption body 100.

Of particular advantage here is the fact that the deformation path of exterior car body component 136 is used in the direction towards interior car body component 134, to transfer impact force F to energy absorption body 100, so that the impact energy is absorbed and the rigidity of the passenger compartment can be increased at the same time.

Car body components 134 and 136, for example, are part of a pillar of the motor vehicle, for example the A-pillar, e.g. the foremost pillar in the direction or travel, or of a side door.

Figure 3:
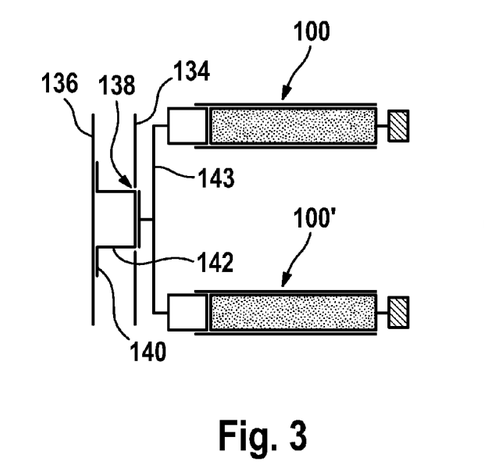

FIG. 3 shows an alternative embodiment, in which area 142 of force transfer element 140 can act on two energy absorption bodies 100 and 100', which are arranged in parallel. Energy absorption bodies 100 and 100' are constructed the same in principle, but may have different dimensions.

Figure 4:
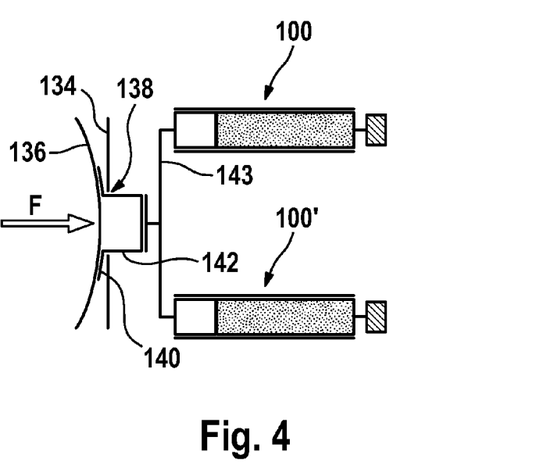

The impact force is transferred from force transfer element 140 to the two energy absorption bodies 100 and 100' by means of an additional force transfer element 143. FIG. 4 shows the embodiment of FIG. 3 during an impact where impact force F acts on exterior car body component 136.

Figure 5:
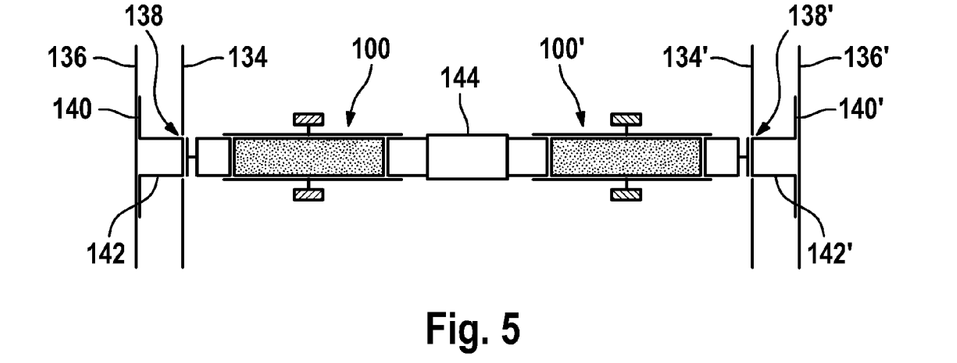

FIG. 5 shows another embodiment in which two energy absorption bodies 100 and 100' are arranged in series. Both energy absorption bodies 100 and 100' are thereby connected to each other by connecting element 144. Area 142, which is arranged on the inside of a left exterior car body component 136, can act on the one energy absorption body 100, while area 142', which is arranged on the inside of a left exterior car body component 136', can act on the other energy absorption body 100'.

For example, car body components 136, 134 are part of the left A-pillar or driver's door and car body components 136', 134' are part of the right A-pillar or passenger door of the motor vehicle.

For example, a cross member is formed by energy absorption bodies 100 and 100' arranged in series.

Figure 6:
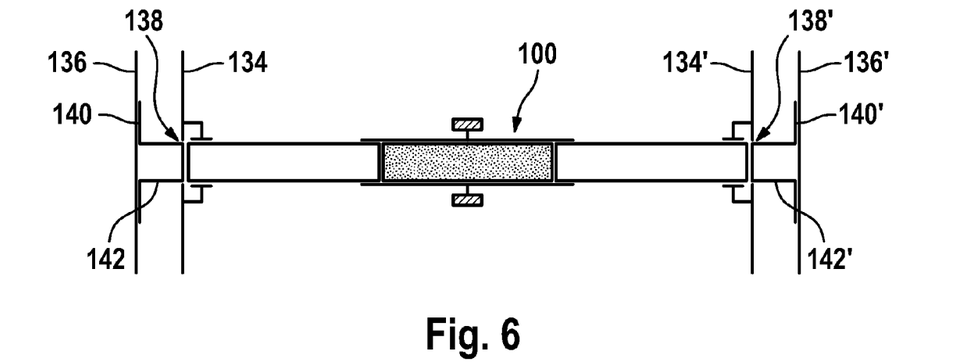

FIG. 6 shows another embodiment with a single energy absorption body 100, which can be acted upon on both sides by an impact force.

It is preferable to use an energy absorption body with orthotropic elasticity properties. It is also preferable that the energy absorption body has a high rigidity in axial direction and a low rigidity in radial direction, whereas the energy absorption body is arranged such that in the event of a lateral impact on the motor vehicle, the energy absorption body is stressed in axial direction.

Figure 7:
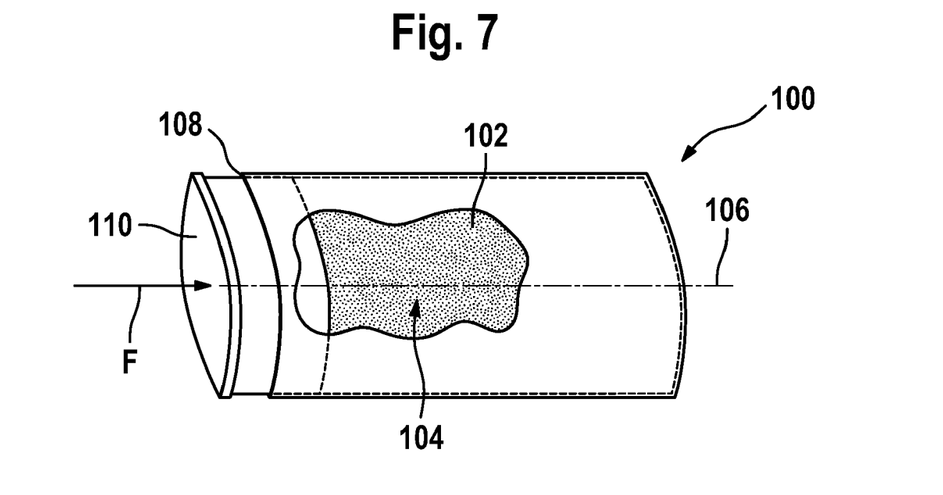

FIG. 7 shows an embodiment of an energy absorption body 100 that features such mechanical properties. Energy absorption body 100 has a hollow piece 102, in which filling 104 is found.

Hollow piece 102 essentially extends along an axial direction 106. Hollow piece 102 has an opening 108, through which a piston 110 can be pressed on filling 104 if a force with a component F acts on piston 110 in axial direction 106.

Figure 8:
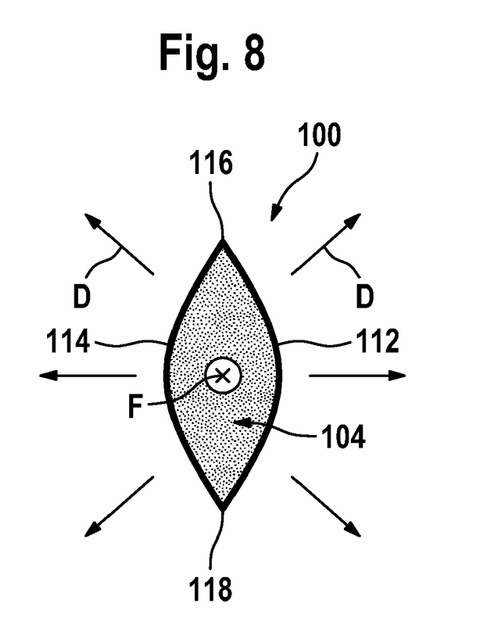

FIG. 8 shows a cross section of energy absorption body 100. As shown in FIG. 8, hollow piece 102 of energy absorption 100 has a front partition 112 and a rear partition 114. Front partition 112 and rear partition 114 are connected to one another in their border areas 116 and 118.

When force F acts on pistons 110 of energy absorption body 100, a pressure D is built up in filling 104. Pressure D is absorbed by partitions 112 and 114 of hollow piece 102, while partitions 112 and 114 are placed under tension. By means of this tensile load of partitions 112 and 114 of hollow piece 102, its rigidity increases, and energy is absorbed at the same time.

Figure 9:
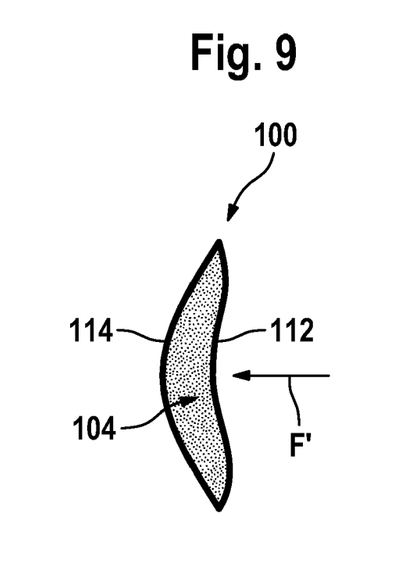

FIG. 9 shows a cross section of energy absorption body 100, if it is stressed by a force that features a force component F' running in radial direction. Force F' results in an elastic or plastic and irreversible deformation of energy absorption body 100, in particular on its front partition 112. Due to the deformation of front partition 112, filling 104 is also deformed respectively. Depending on the size of force F', a more or less large deformation of rear partition 114 may also result.

Front partition 112 and rear partition 114 of hollow piece 102 can consist of the same, similar, or different materials, such as metal, in particular steel, plastic, in particular fiber optic-reinforced plastic and/or endless fiber optic-reinforced plastic. Piston 110 can also consist of such materials.

Filling 104 may, for example, feature an essentially incompressible material such as a fluid, in particular water, or oil. Filling 104 may also feature a material with a relatively large transversal contraction coefficient, so that the material increases in thickness vertically under stress in an axial direction, so as to divert the force acting in axial direction on front partition 112 and rear partition 114.

Filling 104 can also feature a type of foam, in particular plastic foam, such as polyurethane foam or particle foam and/or metal foam. For example, it can be foam filled with a filling material, e.g. a so-called foam compound material.

Filling 104 can, for example, contain several solids or be formed by such solids. For example, the solids in filling 104 may be surrounded by a fluid or embedded in a matrix. The solids may consist of an essentially incompressible material or of a material with a distinct transverse contraction. For example the solids might be ball-shaped or oval or may have a different geometric shape. The preferred dimension of the solids will be in the range of 0.5 cm and 5 cm.

Figure 10:
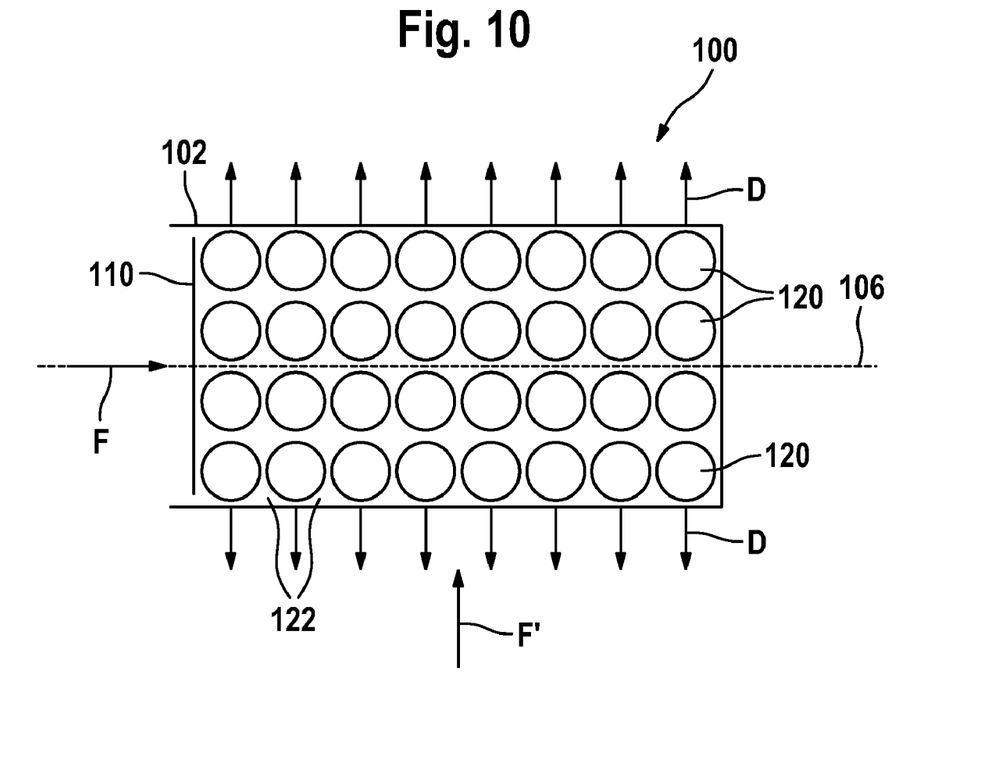

FIG. 10 shows a longitudinal section through an embodiment of energy absorption body 100 according to the invention. In this embodiment, filling 104 contains several solids 120. These may be arranged loosely or embedded in a matrix in hollow piece 102. For example, solids 120 will be distanced from one another by a foam matrix 122, so that solids 120 do not touch each other in normal operation. This will prevent body rattles in particular. Foam matrix 122 with its contained solids 120, for example, may be produced by adding solids 120 during the foam process, for example during a polyurethane foam process.

If force F acts on piston 110 during a lateral impact, for example, foam matrix 122 is compressed, so that solids 120 touch. This results in the buildup of pressure D and the reinforcement of hollow piece 102.

If force F' acts on energy absorption body 100 in radial direction, however, hollow piece 102 is deformed together with the foam matrix contained within, in order to absorb energy.

Solids 120 can consist of balls made of glass powder or plastic, for example. For example, solids 120 may consist of a material with a relatively large transverse contraction coefficient.

Figure 11:
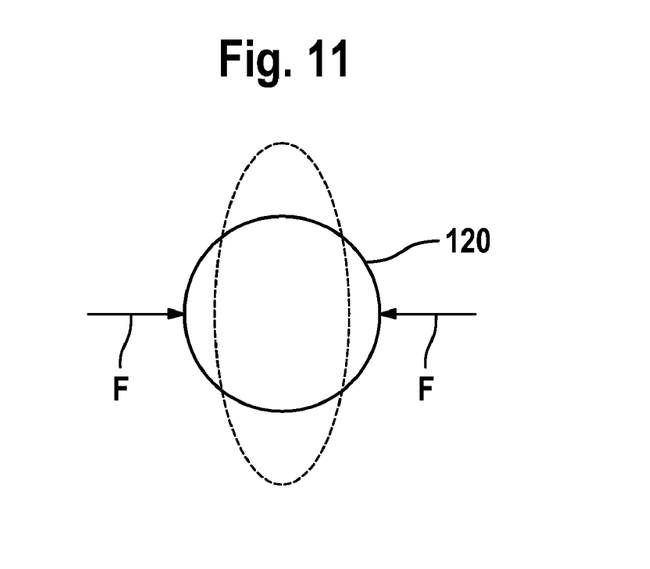

FIG. 11 shows, by way of example, such a solid 120 in unstressed state. If solid 120 is stressed in axial direction by force F, the extension of solid 120 increases vertically to this, as shown in FIG. 11 by the dotted line. In this way, force F is diverted to the partitions of hollow piece 102.

Figure 12:
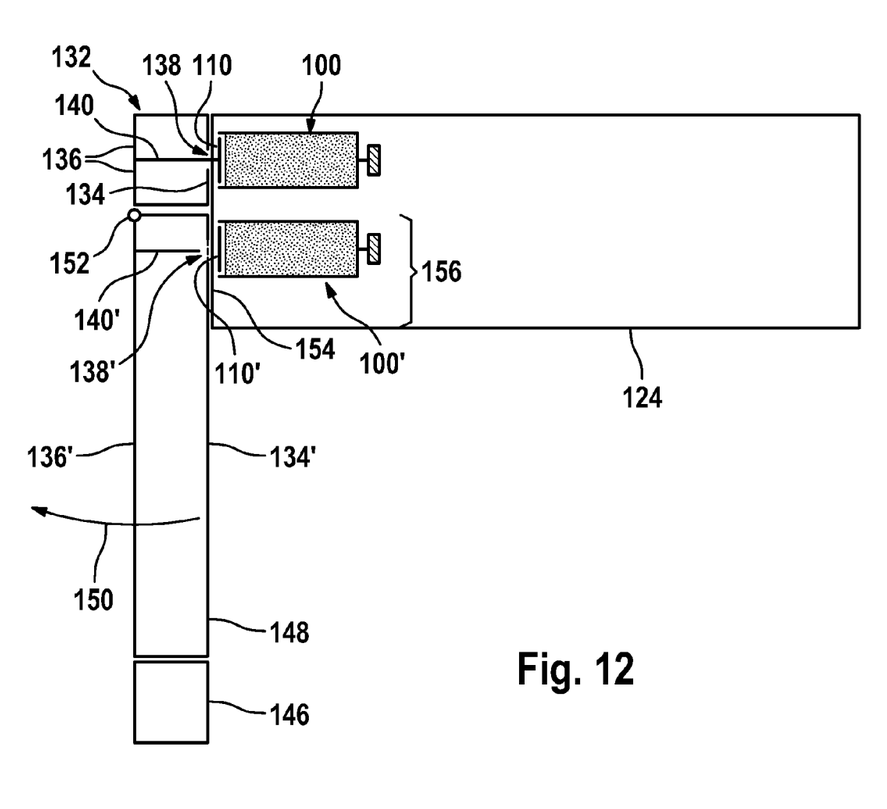

FIG. 12 shows a schematic top view of an instrument panel 124. At the level of an A-pillar 132 is an initial energy absorption body 100 in the direction of travel. Piston 110 of energy absorption body 100 is connected mechanically to an exterior car body component 134 formed by A-pillar 132, e.g. with the outside panel of A-pillar 132. A motor vehicle door 148 is arranged between A-pillar 132 and B-pillar 146 of the motor vehicle, which can be swung open in direction of arrow 150 around its pivot axis 152.

Motor vehicle door 148 has an opening 138', which is arranged opposite a lateral panel 154 of instrument panel 124 when motor vehicle door 148 is closed. In the event of a lateral impact, force transfer element 140' passes through opening 138' to act on piston 110' of energy absorption body 100' with a lateral impact force. Opening 138' can be concealed in normal operation with a cover, such as a cap, a decorative strip, or the like. In the case of a lateral impact, this cover will be removed or pierced by force transfer element 140' so that opening 138' is released.

It is particularly advantageous in this case if overlapping area 156 of lateral panel 154 and motor vehicle door 148 is used to increase the rigidity of the passenger compartment in the event of a lateral impact. At the same time, energy absorption body 110' can work as a so-called knee-pad in the event of a frontal impact.

Figure 13:
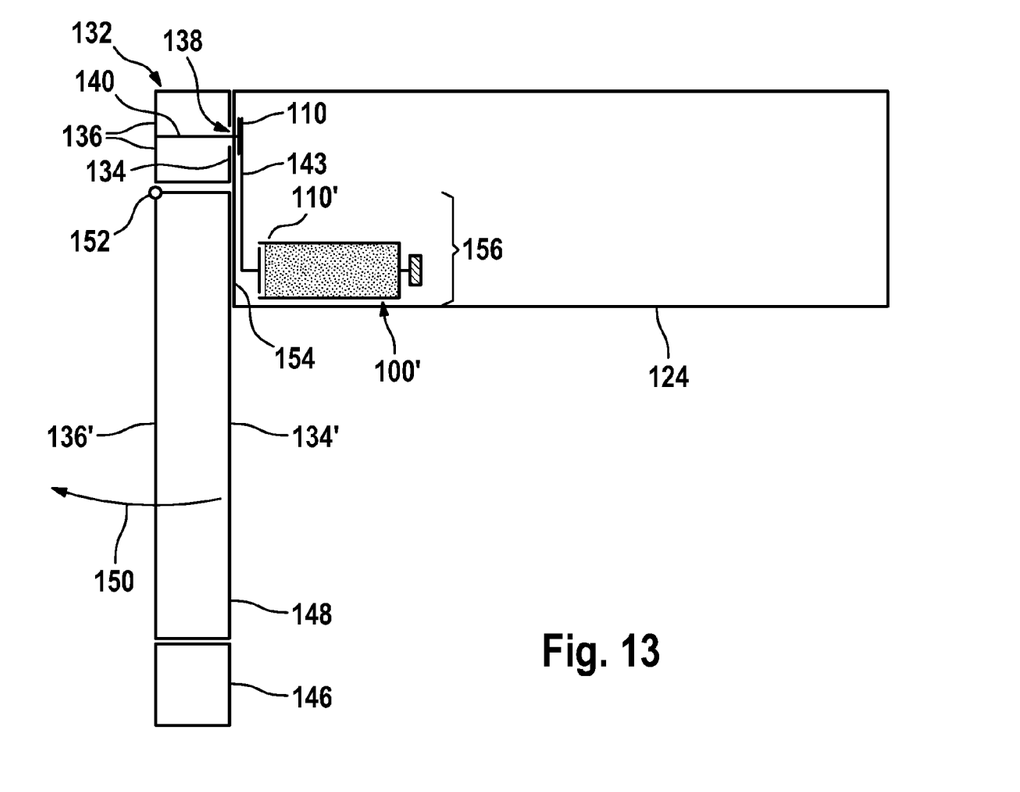

FIG. 13 shows a variation of the embodiment of FIG. 12, in which energy absorption body 110' can be acted upon with a lateral impact force from force transfer element 140 via an angular force transfer element 143. This embodiment is particularly advantageous, since energy absorption body 110' is arranged opposite one side of motor vehicle door 148, more specifically in overlapping area 156 of the side of motor vehicle door 148 with lateral panel 154 of instrument panel 124. This provides reinforcement in the event of a lateral impact, which can prevent or reduce the penetration of motor vehicle door 148 into the motor vehicle interior.

Figure 14:
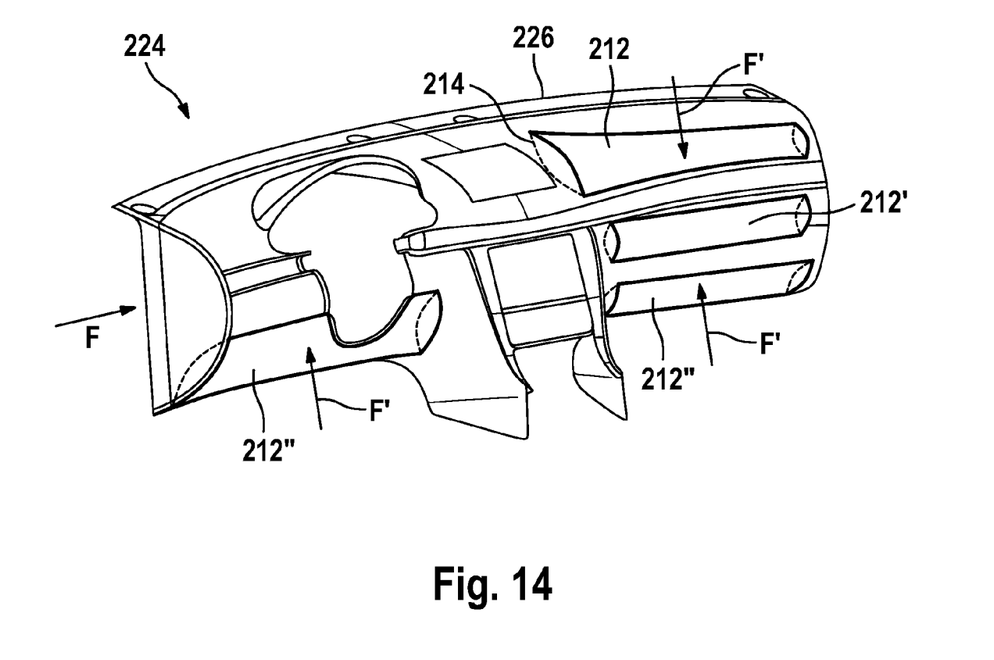

FIG. 14 shows an instrument panel 224 in a perspective view. Instrument panel 224 can feature one or more energy absorption bodies in accordance with the invention. For example, the front partition for an energy absorption body arranged underneath instrument panel 224 is formed by a section 212 in the head impact area on the passenger side, rear partition 214 of which is shown in FIG. 14 by dotted lines.

By means of a section 212' in the glove compartment area of instrument panel 224, an additional front partition can be formed for an energy absorption body arranged behind it. By means of a section 212" in a knee-impact area of instrument panel 224, the front partition of energy absorption bodies arranged behind it can be formed on the driver's side and/or the passenger side.

For example, instrument panel 224 has a support layer made of ABS or another type of plastic. This support layer acts like a partition in sections 212, 212' and 212" for producing hollow piece 102 of the energy absorption body. When dealing with a self-supporting instrument panel, the support layer preferably consists of a blend of Styrene/Maleic Anhydride (SMA) and Acrylonitrile-Butadiene-Styrene-Copolymer (ABS). In this case, a cross member is not required.

A passenger airbag can be arranged between windshield base 226 and section 212, such as the so-called windshield-area airbag, the opening flap of which hits against the windshield when the airbag is released.

During a lateral impact, force F acts in axial direction on the energy absorption body or bodies which are arranged underneath instrument panel 224. Because of the increase in rigidity of the energy absorption bodies, the rigidity of the passenger compartment increases in axial direction, so that car body components can be prevented from penetrating into the motor vehicle interior.

If, on the other hand, the driver and/or passenger are flung forward during a frontal impact and their heads and/or knees collide with sections 212 and/or 212", then force F' acts in a radial direction, so that the respective energy absorption bodies are deformed in order to absorb the impact energy, thus avoiding injuries.

Figure 15:
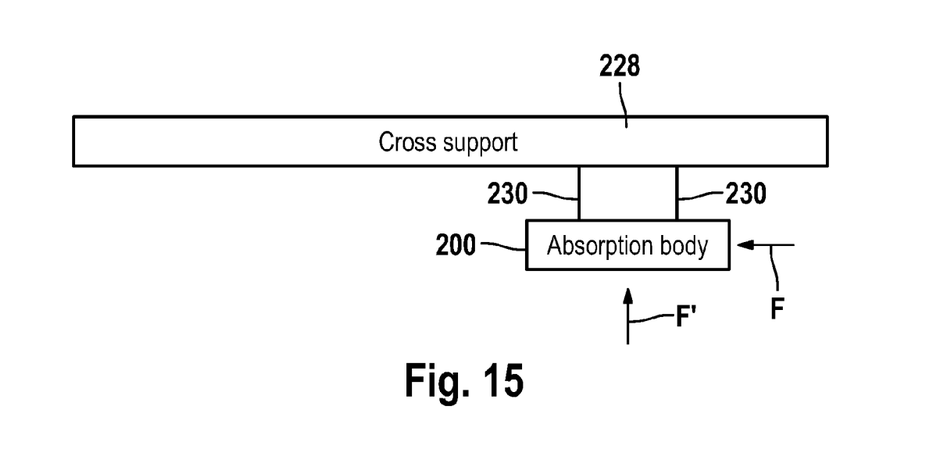

FIG. 15 shows a cross member 228, which can run underneath instrument panel 224. Absorption body or bodies 200 of instrument panel 224 are preferably supported on cross member 228, such as by metal straps 230.

LIST OF REFERENCE MARKS

100 Energy absorption body
100' Energy absorption body
102 Hollow piece
104 Filling
106 Axial direction
108 Opening
110 Piston
112 Front partition
114 Rear partition
116 Border area
118 Border area
120 Bodies [solids]
122 Foam matrix
124 Instrument panel
132 A-pillar
134 Interior car body component
136 Exterior car body component
138 Opening
138' Opening
140 Force transfer element
140' Force transfer element 142 Area
142' Area
143 Force transfer element
144 Connecting element
146 B-pillar
148 Motor vehicle door
150 Direction of arrow
152 Pivot axis
154 Lateral panel
156 Overlapping area
200 Energy absorption body
212 Section
212' Section
212" Section
214 Rear partition
224 Instrument panel
226 Windshield base
228 Cross member
230 Strap
300 Energy absorption body
310 Section
310' Section
328 Cross member
332 A-pillar

The invention claimed is:

1. A Device for protection against an impact, comprising:
at least one energy absorption body, which observed from a direction of an exterior car body component, is arranged behind an interior car body component, and
means for transferring a force (F) in effect during an impact from the exterior car body component through an opening of the interior car body component to the energy absorption body,
wherein the energy absorption body includes a hollow body with an incompressible filling that extends in an axial direction and, in case of an impact, the force (F) exerts pressure (D) on a piston, so that the hollow body exhibits a orthotropic elasticity wherein the hollow body possesses a higher rigidity in an axial direction than in a radial direction.

2. The Device of claim 1, wherein the means for transferring includes an area protruding in the direction of the opening.

3. The Device of claim 2, wherein the area extends through the opening.

4. The Device of claim 2, wherein the area protrudes into the opening.

5. The Device of claim 2, wherein the area is shorter than a distance between the exterior car body component and the interior car body component, so that the area passes through the opening during an impact.

6. The Device of claim 5, wherein the opening is closed by means of a cover.

7. The Device of claim 1, wherein the exterior car body component pertains to a lateral exterior panel and the interior car body component pertains to a lateral interior panel.

8. The Device of claim 1, wherein the exterior car body component pertains to an external limit of a pillar and the interior car body component pertains to an internal limit of the pillar.

9. The Device of claim 8, wherein the pillar pertains to a front pillar of a motor vehicle.

10. The Device of claim 1, wherein the exterior car body component pertains to an exterior door panel and the interior car body component pertains to an interior door panel.

11. The Device of claim 10, wherein the opening is arranged so that the opening is situated opposite a lateral panel of an instrument panel when the door is closed.

12. The Device of claim 1, wherein the means for transferring the impact force are created by a panel fastened to an inside of the exterior car body component.

13. The Device of claim 12, wherein the panel features a U-shaped profile section through which an area protruding in a direction of the opening is formed.

14. The Device of claim 1, wherein a partition of the hollow body and the filling is designed in such a way that the hollow body is deformed in the event of a force (F) in effect in radial direction.

15. The Device of claim 1, wherein a section of a partition of the hollow body is formed by a motor vehicle interior lining.

16. The Device of claim 1, further comprising energy absorption bodies arranged in parallel.

17. The Device of claim 1, further comprising energy absorption bodies arranged in series.

18. The Device of claim 1, wherein a minimum of one energy absorption body is integrated into a cross member.

19. The Device of claim 1, wherein a minimum of one energy absorption body is integrated into an instrument panel.

20. The Device of claim 19, wherein the instrument panel is self-supporting.

21. The Device of claim 19, wherein the instrument panel includes a blend of Styrene/Maleic Anhydride (SMA) and Acrylonitrile-Butadiene-Styrene-Copolymer (ABS).

22. The Device of claim 1, wherein a minimum of one energy absorption body is arranged in an overlapping area of a motor vehicle door with a lateral panel of an instrument panel, and has a force transfer element for transferring the force from an A-pillar to the energy absorption body.

23. A motor vehicle pillar, comprising:
an exterior panel,
an interior panel, and
means for transferring a lateral impact force (F) from the exterior panel through an opening of the interior panel to at least one energy absorption body,
wherein the energy absorption body is arranged behind the interior panel as seen from the direction of the exterior panel, and the energy absorption body includes a hollow body with an incompressible filling that extends in an axial direction and in case of an impact, the force (F) exerts pressure (D) on a piston, so that the hollow body exhibits a orthotropic elasticity wherein the hollow body possesses a higher rigidity in an axial direction than in a radial direction.

24. A motor vehicle door, comprising:
an exterior panel,
an interior panel, and
means for transferring a lateral impact force (F) from the exterior panel through an opening of the interior panel to at least one energy absorption body,
wherein the energy absorption body is arranged behind the interior panel as seen from the direction of the exterior panel, and the energy absorption body includes a hollow body with an incompressible filling that extends in an axial direction and in case of an impact, the force (F) exerts pressure (D) on a piston, so that the hollow body exhibits a orthotropic elasticity wherein the hollow body possesses a higher rigidity in an axial direction than in a radial direction.

25. The motor vehicle door of claim 24, wherein the opening is arranged in the vicinity of a pivot axis of the motor vehicle door.

* * * * *